United States Patent
Tjerrild

(10) Patent No.: US 7,931,242 B2
(45) Date of Patent: Apr. 26, 2011

(54) SUPPORT ASSEMBLIES FOR PIPES, CONDUITS AND TUBES

(75) Inventor: James William Tjerrild, Fresno, CA (US)

(73) Assignee: Potential Design, Inc., Fresno, CA (US)

( * ) Notice: Subject to any disclaimer, the term of this patent is extended or adjusted under 35 U.S.C. 154(b) by 0 days.

(21) Appl. No.: 12/634,484

(22) Filed: Dec. 9, 2009

(65) Prior Publication Data

US 2010/0084519 A1     Apr. 8, 2010

Related U.S. Application Data

(63) Continuation of application No. 11/249,131, filed on Oct. 12, 2005, now Pat. No. 7,651,056, which is a continuation-in-part of application No. 11/053,216, filed on Feb. 8, 2005, now abandoned.

(51) Int. Cl.
*E21F 17/02* (2006.01)
(52) U.S. Cl. ............ 248/58; 248/74.1; 248/317
(58) Field of Classification Search ............ 248/58, 248/59, 61, 62, 72, 74.1, 317; 52/167.1, 52/713, 39
See application file for complete search history.

(56) References Cited

U.S. PATENT DOCUMENTS

| | | | |
|---|---|---|---|
| 2,375,513 A | 5/1945 | Bach | |
| 3,414,219 A | 12/1968 | Siegel | |
| 3,854,684 A | 12/1974 | Moore | |
| 3,981,469 A | 9/1976 | Torbet et al. | |
| 4,065,218 A | 12/1977 | Biggane | |
| 4,078,752 A | 3/1978 | Kindorf | |
| 5,188,317 A | 2/1993 | Roth | |
| 5,412,843 A | 5/1995 | Krongauz et al. | |
| 5,423,507 A | 6/1995 | Florent et al. | |
| 5,653,426 A | 8/1997 | Meisel | |
| 5,702,077 A | 12/1997 | Heath | |
| 6,026,545 A | 2/2000 | Duggan | |
| 6,050,035 A | 4/2000 | Thompson et al. | |
| 6,415,560 B1 | 7/2002 | Rinderer | |
| 7,651,056 B2 * | 1/2010 | Tjerrild ............ | 248/58 |

OTHER PUBLICATIONS 10 photographs of conventional brackets sold before Jan. 28, 2003.
Press Release dated Jan. 28, 2003.
Two photographs showing wall mount and trapeze struct sold prior to Jan. 28, 2003.
"Unistrut Product Application Guide IND 800," in existence prior to Feb. 8, 2005, pp. 1 6-9, 26, 28-33 and 48, Wayne, MI.

* cited by examiner

*Primary Examiner* — Anita M King
(74) *Attorney, Agent, or Firm* — James F. Hann; Haynes Beffel & Wolfeld LLP

(57) ABSTRACT

Wall-mounted type support strut assemblies attach pipes, conduit, and tubes to surfaces in a sanitary manner. The strut assemblies repel contaminants, are easy to inspect, and are easy to clean.

9 Claims, 5 Drawing Sheets

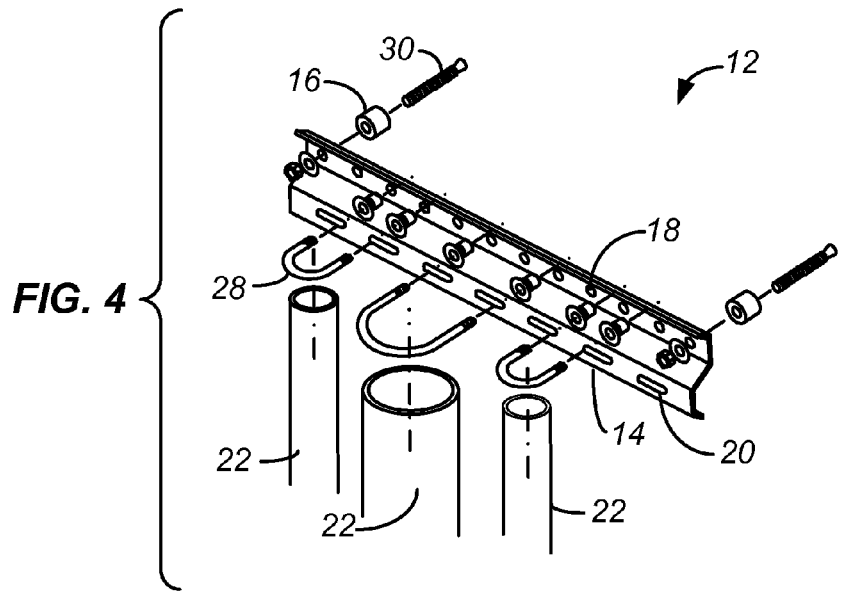
FIG. 4
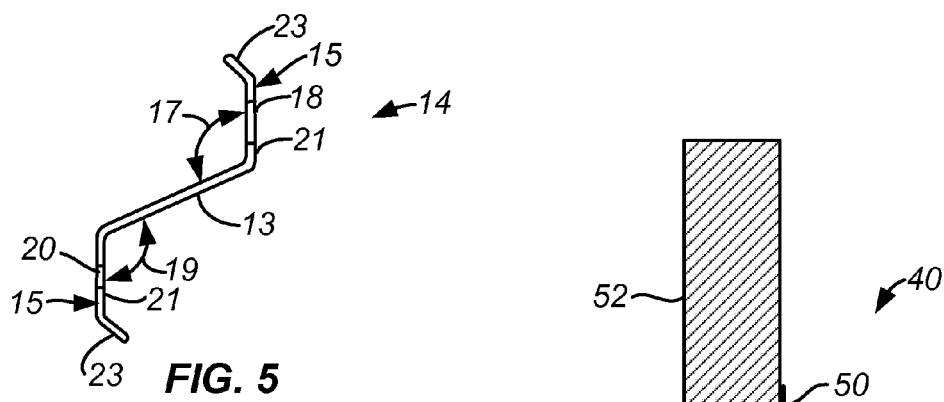
FIG. 5
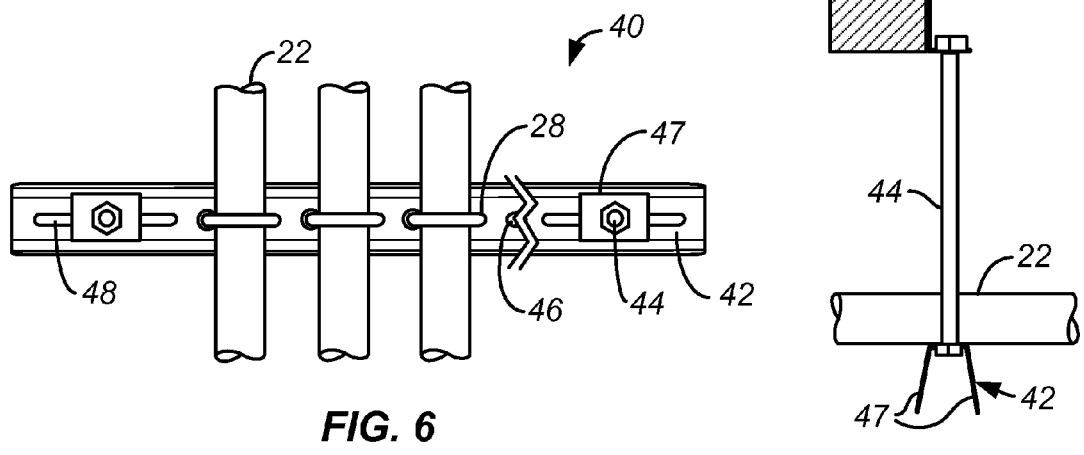
FIG. 6
FIG. 7

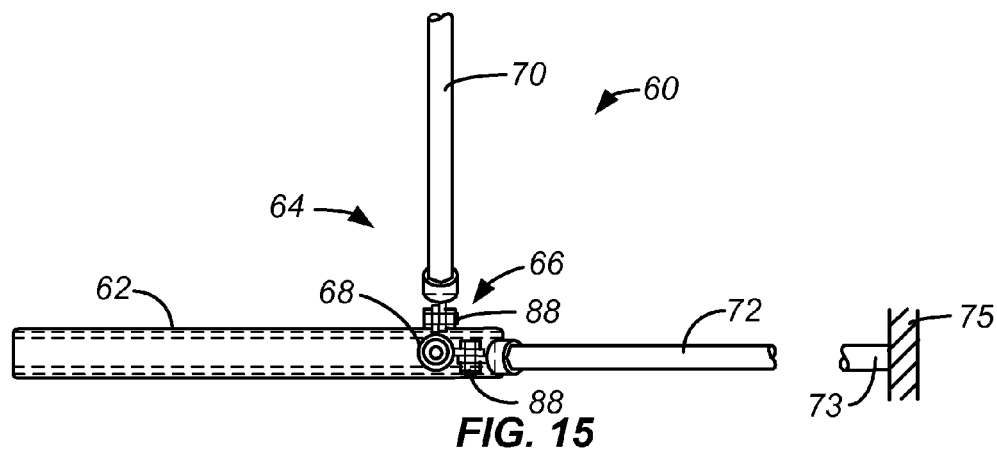
FIG. 15
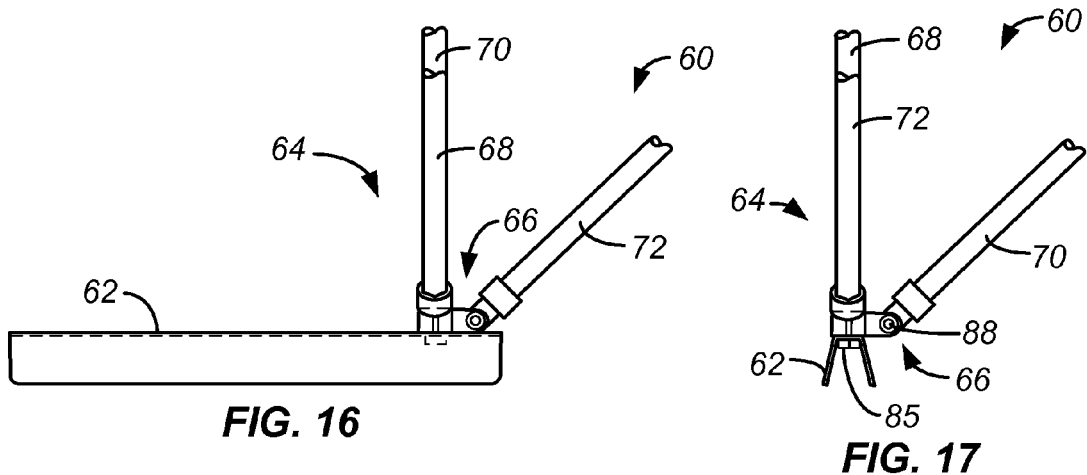
FIG. 16
FIG. 17
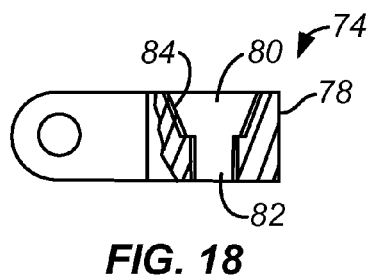
FIG. 18
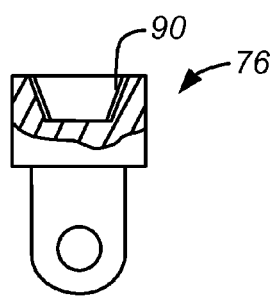
FIG. 20
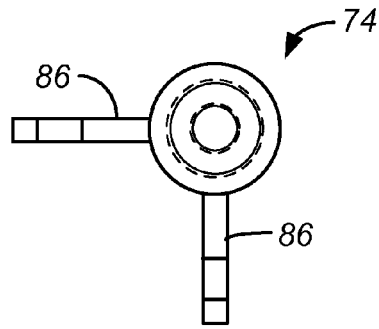
FIG. 19
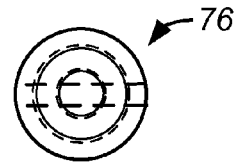
FIG. 21

SUPPORT ASSEMBLIES FOR PIPES, CONDUITS AND TUBES

CROSS-REFERENCE TO RELATED APPLICATIONS

This application is a continuation of U.S. patent application Ser. No. 11/249,131, filed 12 Oct. 2005, entitled Method of Mounting Support Assemblies for Pipes, Conduits and Tubes, which is a continuation-in-part of U.S. patent application Ser. No. 11/053,216, filed 8 Feb. 2005, entitled Sanitary Pipe Mounting System, the entire contents of all preceding applications are incorporated herein by reference.

BACKGROUND OF THE INVENTION

The present invention is intended to be used, for example, in food processing and pharmaceutical processing facilities to improve the inspectability and cleanability of pipe, conduit, and tube installations. Currently, these facilities are forced to use conventional mounting systems to install pipe, conduit, and tube. The conventional mounting systems are inherently dirty. Also, the conventional mounting systems are exceedingly difficult to inspect and clean.

BRIEF SUMMARY OF THE INVENTION

The invention is directed to a system for mounting pipe, conduit, and tube in, for example, food grade or pharmaceutical grade installations. The invention is designed such that it resists contamination, is easy to inspect, and is easy to clean.

One aspect of the invention is directed to a support assembly for mounting to an upright support. The support assembly includes a strut, an upright support fastener assembly, and a supported element fastener assembly. The strut has a central section and first and second end parts, the first and second end parts being rigid extensions of the central section. The end parts extend from the central section at angles between 100° and 130°. The upright support fastener assembly is secured to the first end part and comprises an anchor engaging the first end part and engageable with an upright support. The supported element fastener assembly is securable to the second end part and to a supported element. The support assembly enhances sanitation by effectively eliminating horizontal surfaces and by spacing the strut away from the upright support. In some examples the upright support fastener assembly further comprises a spacer positionable between the first end part and the upright support, the spacer having no horizontally oriented surfaces. In some examples the central section of the strut comprises first and second dimension. The first dimension is measured between the first and second portions. The second dimension is measured horizontally and perpendicular to the first dimension. The second dimension is substantially greater than the first dimension.

Another aspect of the invention is directed to a method for mounting a supported element to an upright support. A support assembly is obtained. The support assembly includes a strut, an upright support fastener assembly and a supported element fastener assembly. The strut has a central section and first and second end parts extending from the central section, the first and second end parts being rigid extensions of the central section. The upright support fastener assembly is securable to the first end part and includes an anchor engageable with the first end part and with an upright support. The upright support fastener assembly also includes a spacer positionable between the first end part and the upright support. The supported element fastener assembly is securable to the second end part. The first end part of the strut is mounted to the upright support using the upright support fastener assembly to place the strut in a generally horizontal orientation. The supported element is secured to the second end part of the strut. Sanitation is enhanced by effectively eliminating horizontal surfaces, and by spacing the strut away from the upright support with the spacer.

Various features and advantages of the invention will appear from the following description in which the preferred embodiments have been set forth in detail in conjunction with the accompanying drawings.

BRIEF DESCRIPTION OF THE DRAWING

FIG. 4 is an exploded isometric assembly of the assembly of FIG. 1;

FIG. 5 is an end view of the wall-mounted strut of FIG. 1;

FIG. 6 is a top view of trapeze type support strut assembly;

FIG. 7 is a side view of the assembly of FIG. 6;

FIGS. 15-21 disclose a trapeze type of support strut assembly designed for both enhanced cleanliness and seismic stability.

DETAILED DESCRIPTION OF THE INVENTION

Figure 1:
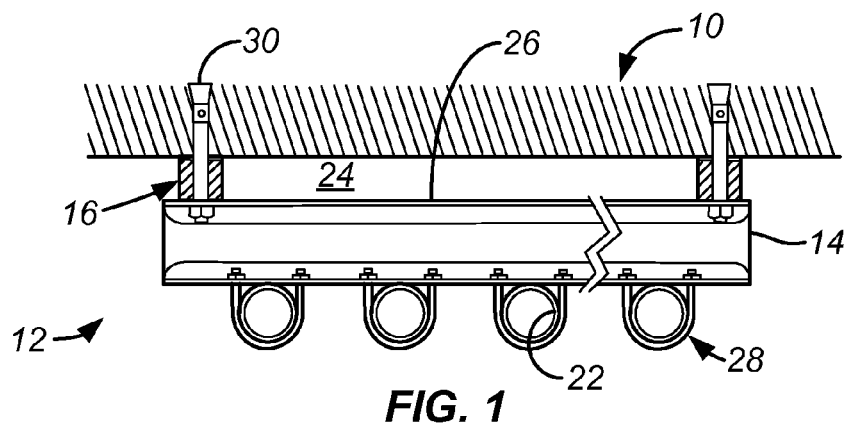
FIG. 1 is a top view of a wall mounted type of support strut assembly.

The following description of the invention will typically be with reference to specific structural embodiments and methods. It is to be understood that there is no intention to limit the invention to the specifically disclosed embodiments but that the invention may be practiced using other features, elements, methods and embodiments.

The invention is directed to wall-mounted type of mounting system and a trapeze type of mounting system typically used to sanitarily mount pipes, conduits, and tubes to vertical and horizontal surfaces in locations that require a high degree of cleanliness. These mounting systems would typically be employed in, for example, food processing and pharmaceutical installations.

In the past, these facilities have had only conventional strut systems to mount their pipes, conduit, and tubes. This has been a major food and drug safety problem, as conventional strut systems are easily soiled, harbor contaminants, are difficult to inspect, and difficult to clean.

Mounting systems made according to the invention are typically configured for two general applications. When mounting pipes, conduits, or tubes to a wall 10 (or other vertical or generally vertical surface), the wall-mounted type of support strut assembly 12 (shown in FIGS. 1-5) is preferred. The main components of this assembly are wall mount strut 14 and multiple spacers 16, spacers 16 shown in the form of cylindrical sleeves. The wall mount strut 14 may be punched and cold formed from 12 gauge T304 stainless steel sheet that is polished to a #4 sanitary finish. Other materials and fabrication techniques may also be used. The multiple punched holes 18 and slots 20 permit mounting of the strut 14 to the wall 10 and pipes 22 to the strut in multiple locations.

Figure 2:
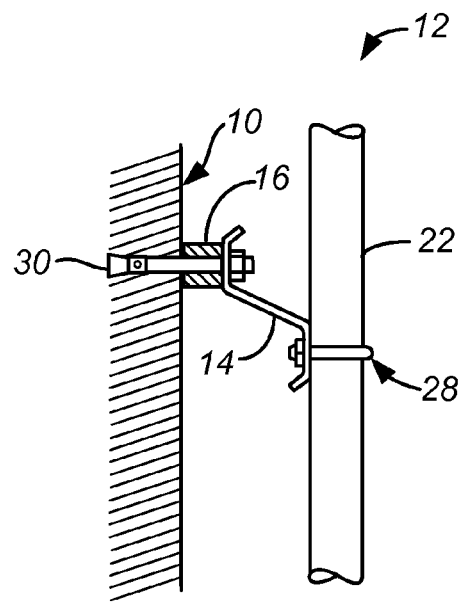
FIG. 2 is a side view of the assembly of FIG. 1.

An important aspect of the invention is that the cross section of the strut 14 has no horizontal surfaces (see FIG. 2). Conventional struts typically have multiple horizontal surfaces. The configuration of strut 14 is better than conventional strut, in that is tends to shed falling contaminants downward, as opposed to collecting them. The wall mount spacers 16 are typically machined from solid 1" diameter T304 stainless steel round bar. The spacers 16 preferably hold the strut 14 away from the wall 10 at a distance of not less than 1". Conventional strut systems typically mount the strut directly to, that is in contact with, the wall. Assembly 12 is also better than conventional systems in that this gap 24 between the wall 10 and the back 26 of the strut 14 facilitates inspection, cleaning, and allows falling contaminants and water from wash downs to fall through this gap and downward. Conversely, the back surface of conventional strut is mounted directly to the wall and is therefore not easily inspectable or cleanable, and may harbor filth and mildew. The pipes 22, conduits, or tubes are preferably attached to the wall mount strut 14 with stainless steel U-bolts 28 of minimum thread length, as threads are difficult to clean. The entire assembly may be attached to the wall 10 with ⅜" diameter stainless steel wedge threaded anchors 30 secured in place by a nut and washer, the combination acting as a nut and bolt assembly (see FIG. 4).

Strut 14 includes a central section 13 and end parts 15. The end parts 15 preferably extend from the central section at angles 17, 19 of between about 100° and 130°, and more preferably about 115°. Central section 13 preferably extends at an angle to the horizontal of about 10° to 40°, and more preferably about 25°. End parts 15 each comprise a main portion 21 and a secondary, outer portion 23, the outer portions preferably extending from the main portion at an angle of between about 30° and 60°, and more preferably about 45°.

To mount pipes 22, conduits, or tubes below a ceiling (or other horizontal surfaces), the trapeze type of support strut assembly 40 (shown in FIGS. 6-10) is preferred. The main components of this assembly 40 are trapeze mount strut 42 and smooth hanger rods 44. The trapeze mount strut 42 is punched and cold formed from 12 gauge T304 stainless steel sheet that is polished to a #4 sanitary finish. The multiple punched holes 46 and slots 48 permit mounting of strut 42 to ceiling and pipes 22 to strut 42 in multiple locations. In this embodiment strut 42 is an open C-channel with legs 47 pointing downward. Conventional trapeze struts are closed C-channels with hemmed legs that point upward. Strut 42 has a base of 41 with upper and lower surfaces 43, 45 and legs 47 extending downwardly and outwardly from the lower surface at angles 49 of greater than 180° from upper surface 43.

Assembly 40 is better than conventional strut systems, in that the legs 47 of trapeze mount strut 42 are open, not hemmed, and point downward, thus allowing easy inspection, cleaning, and eliminates the upward facing troughs of conventional trapeze mount struts that collect and hold contaminants. Conversely, conventional trapeze mount installations have upward facing channels that trough to hold falling debris, and wash down water. Their design is so enclosed as to require disassembly for cleaning in some cases to achieve an adequate level of sanitation.

The smooth hanger rods 44 are preferably fabricated from T304 stainless steel schedule 80 pipe. They are tapped in each end for ⅜" national coarse threads, and the outer surface is polished to a #4 sanitary finish. Conventional trapeze struts are typically mounted with continuously threaded rod. Trapeze type of support strut assembly 40 is better than conventional strut assemblies because the smooth hanger rods 44 are easy to clean, where as the outer surfaces of the conventional strut's continuously threaded rods are so convoluted, that they are extremely difficult to satisfactorily clean. The pipes, conduits and tube are attached to the trapeze mount strut with the same stainless steel, minimum thread U-bolts 28 used for wall mount strut 14. The entire trapeze type of support strut assembly 40 is typically attached to the ceiling, such as to ceiling member 52, with L-brackets 50.

Overall, stainless steel strut assemblies 12, 40 provide a means by which one can attach pipes, conduits, and tubes to horizontal and vertical surfaces in a sanitary way. This level of inspectability and cleanability is not provided by conventional struts currently on the market.

Figure 3:
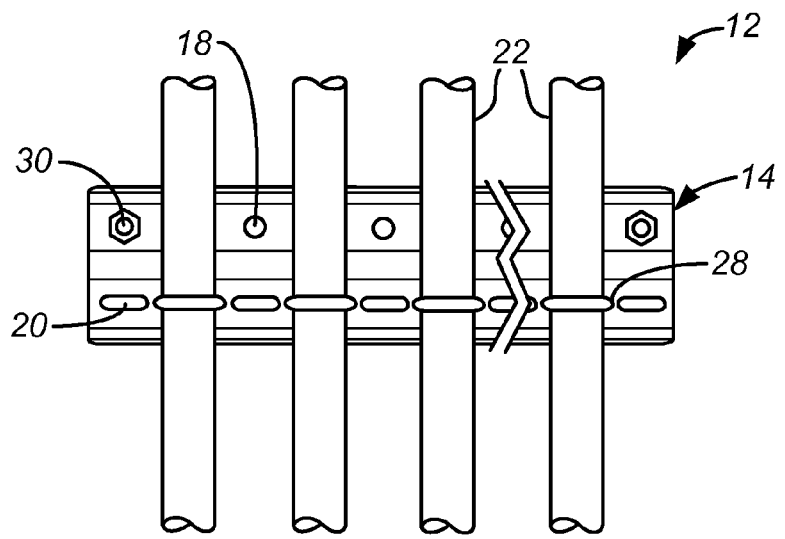
FIG. 3 is a front view of the assembly of FIG. 1.
Figure 8:
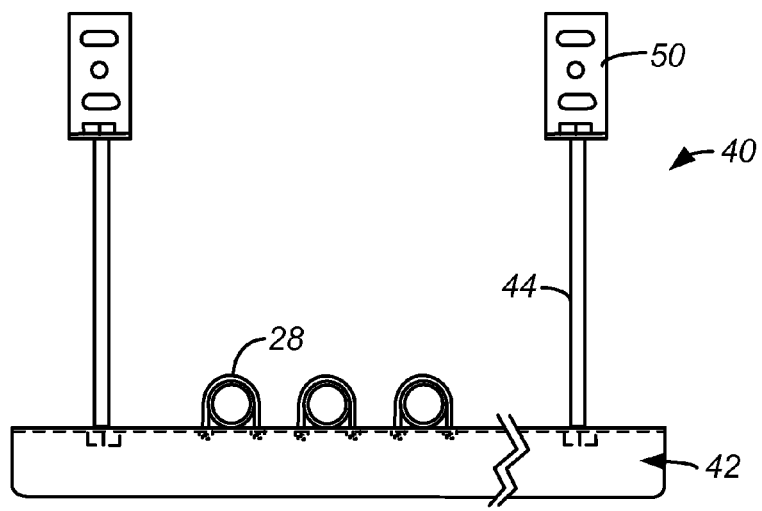
FIG. 8 is a front view of the assembly of FIG. 6.
Figure 9:
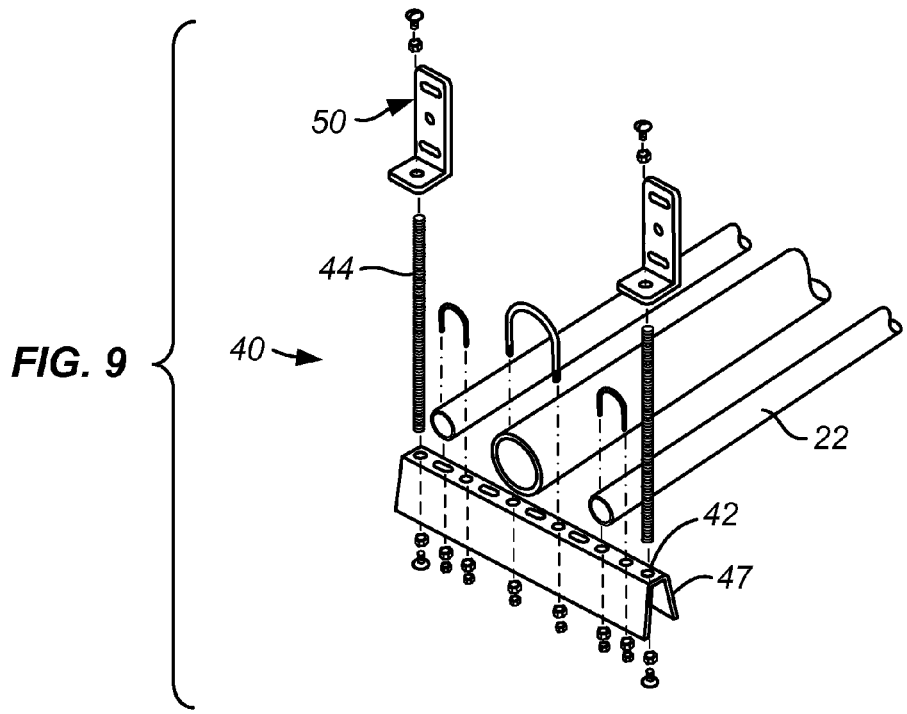
FIG. 9 is an exploded isometric assembly of the assembly of FIG. 6.
Figure 10:
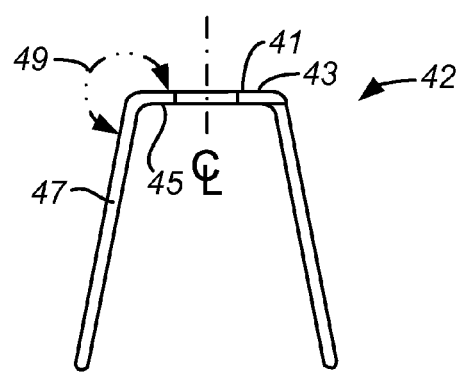
FIG. 10 is an end view of the trapeze mount strut of FIG. 6.
Figure 11:
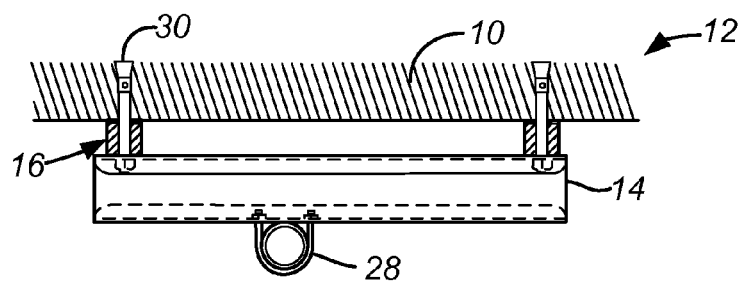
FIGS. 11 and 12 are views similar to FIGS. 1 and 3 of a wall-mounted type of support strut assembly.
Figure 12:
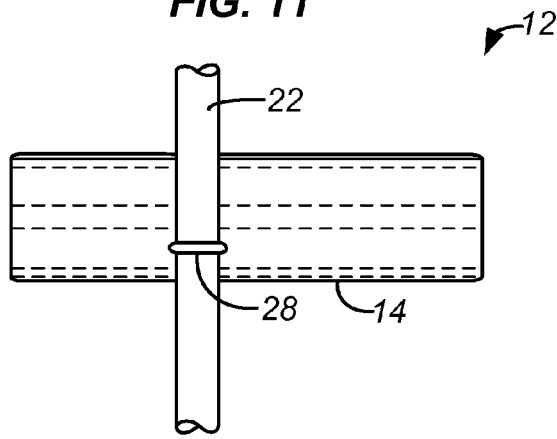
Figure 13:
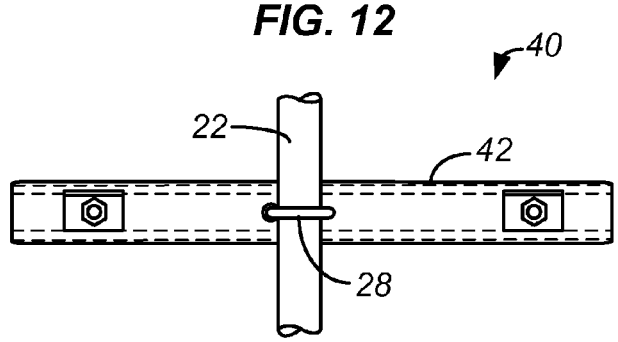
FIGS. 13 and 14 are views similar to FIGS. 6 and 8 of a ceiling-mounted, trapeze type of support strut assembly.
Figure 14:
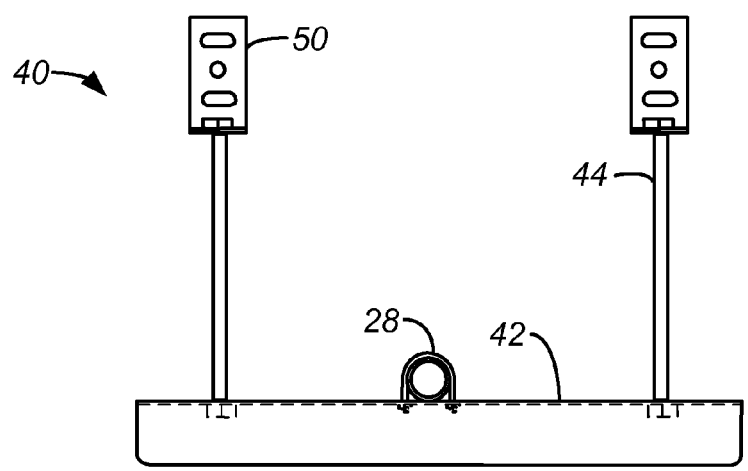

FIGS. 11 and 12 are views similar to FIGS. 1 and 3 of a wall-mounted type of support strut assembly with like references referring to like elements. FIGS. 13 and 14 are views similar to FIGS. 6 and 8 of a ceiling-mounted (or other overhead structure-mounted) trapeze type of support strut assembly with like reference numerals referring to like elements. In both embodiments extra holes and slots have been eliminated from struts 12 and 42 with mounting hardware attached only where needed. The primary advantage from the embodiments of FIGS. 11-14 is the elimination of unnecessary holes, slots and other voids in struts 14, 42 to further enhance sanitation. In the wall-mounted type of strut assembly 12 of FIGS. 11-12, the supporting structure is secured to the strut 14 by drilling holes in the strut, typically in the field to obtain precise, proper placement, to accommodate wedge anchors 30 and U-bolts 28. With the trapeze type of strut assembly 40 of FIGS. 13 and 14, holes are drilled in strut 42 to accommodate hanger rods 44 and U-bolts 28. The mounting hardware is typically mounted in the field by drilling holes in the struts or by welding, or otherwise affixing, the mounting hardware for the tubes, pipes or other conduits to the struts. Other techniques for affixing the mounting hardware to the struts, such through the use of metal strapping or clamps, may also be used. Although the embodiments of FIGS. 11-14 typically require securing the mounting structure along the strut in the field, there is a significant enhancement in the level of sanitation available by eliminating unused holes opening into the ambient environment. The lack of such unused holes not only reduces the total surface area of the strut but also eliminates areas in which dirt, debris and other contaminants can collect.

FIGS. 15-21 disclose a still further embodiment of a trapeze type of support strut assembly designed for both enhanced cleanliness and seismic stability for the pipes, conduits and tubes supported by the assembly. Seismically supported trapeze type of support strut assembly 60 comprises a trapeze type strut 62, similar to the trapeze type strut 42 of FIGS. 13 and 14, supported by a stabilized support assembly 64. Assembly 64 comprises an adapter assembly 66 to which pipes 68, 70 and 72 are threadably mounted. The distal end 73 of each of pipes 68, 70, 72 are secured to a an appropriate building support member 75, such as ceiling member 52 for vertical support pipe 68, using an appropriate bracket or other hardware.

The distal end adapter assembly 66 comprises a vertical adapter 74 and two lateral adapters 76. Vertical adapter 74 has a main, generally cylindrical body 78 having an open bore 80 therethrough. Open bore 80 has a threaded end 82 adjacent to strut 62 and a pipe threaded end 84. A bolt 85, see FIG. 17, is passed upwardly through a hole formed in strut 62 and into threaded end 82 to secure vertical adapter 74 to strut 62. Vertical support pipe 68 is secured to pipe thread end 84 and provides the main vertical support for strut 62.

Lateral adapters 76 are mounted to laterally extending lugs 86 of vertical adapter 74 by nut and bolt assemblies 88. Assemblies 88 act as pivots to permit lateral support pipes 70, 72 to extend at appropriate angles from adapter assembly 66. Lateral adapters 76 have pipe threaded openings 90 to which lateral support pipes 70, 72 are mounted. As shown in FIGS. 16 and 17, each of the lateral support pipes 70, 72 extends laterally away from adapter assembly 66 at an angle to both the vertical and horizontal. Lateral support pipes 66, 70, 72 are preferably secured to the building or other support structure housing the pipes, tubes or conduits and being supported by strut 62, so that during any seismic event relative movement between the support structure and strut 62 is reduced or minimized.

Other modification and variation can be made to the disclosed embodiments without departing from the subject of the invention as defined in following claims.

Any and all patents, patent applications and printed publications referred to above are incorporated by reference.

What is claimed is:

1. A support assembly for mounting to an upright support comprising:
   a strut having a central section and first and second end parts, the first and second end parts being rigid extensions of the central section;
   the end parts extending from the central section at angles between 100° and 130°;
   the central section of the strut comprising:
      a first dimension measured between the first and second end parts; and
      a second dimension measured horizontally and perpendicular to the first dimension, the second dimension being substantially greater than the first dimension;
   an upright support fastener assembly, secured to the first end part, comprising an anchor engaging the first end part and engageable with an upright support; and
   a supported element fastener assembly securable to the second end part and to a supported element;
   whereby the support assembly enhances sanitation by effectively eliminating horizontal surfaces and by spacing the strut away from the upright support.

2. The assembly according to claim 1, wherein the end parts extend from the central section in generally opposite directions.

3. The assembly according to claim 1, wherein the upright support fastener assembly further comprises a spacer positionable between the first end part and the upright support, the spacer having no horizontally oriented surfaces.

4. The assembly according to claim 3, wherein the anchor comprises a threaded nut and bolt assembly and the spacer comprises a cylindrical sleeve.

5. A support assembly for mounting to an upright support comprising:
   a strut having a central section and first and second end parts, the first and second end parts being rigid extensions of the central section;
   the end parts extending from the central section at angles between 100° and 130°;
   an upright support fastener assembly, secured to the first end part, comprising an anchor engaging the first end part and engageable with an upright support;
   the first end part has a main portion to which the anchor is securable and a secondary, outer portion extending from the main portion at an angle of between 30° and 60°; and
   a supported element fastener assembly securable to the second end part and to a supported element;
   whereby the support assembly enhances sanitation by effectively eliminating horizontal surfaces and by spacing the strut away from the upright support.

6. An upright support installation comprising:
   an upright support;
   a supported element; and
   a support assembly, securing the supported element to the upright support, comprising:
      a generally horizontally extending strut having a central section and first and second end parts, the first and second end parts being rigid extensions of the central section, the central section of the strut having:
         a first dimension measured between the first and second end parts; and
         a second dimension measured horizontally and perpendicular to the first dimension, the second dimension being substantially greater than the first dimension;
      an upright support fastener assembly, secured to the first end part, comprising:
         an anchor securing the first end part to the upright support; and
         a spacer positioned between the first end part and the upright support; and
      a supported element fastener assembly securing the supported element to the second end part;
      the support assembly having at least substantially no horizontally oriented surfaces; and
      the central section extending at an angle to horizontal of between 10° and 40° and the end parts extending from the central section at angles between 100° and 130°;
   whereby the support assembly enhances sanitation by effectively eliminating horizontal surfaces and by spacing the strut away from the upright support.

7. The installation according to claim 6, wherein a vertical wall constitutes the upright support and the supported element comprises a generally cylindrical structure.

8. The installation according to claim 6, wherein the central section extends downwardly and outwardly from the first end part.

9. The installation according to claim 6, wherein the strut has no unused holes opening into the ambient air environment.

* * * * *